United States Patent [19]

Brown

[11] Patent Number: 5,128,684
[45] Date of Patent: Jul. 7, 1992

[54] METHOD AND APPARATUS FOR CORRELATING SENSOR DETECTIONS IN SPACE AND TIME

[75] Inventor: Mark W. Brown, Pasadena, Md.

[73] Assignee: Westinghouse Electric Corp., Pittsburgh, Pa.

[21] Appl. No.: 652,825

[22] Filed: Feb. 8, 1991

[51] Int. Cl.$^5$ ................. G01S 13/72; G01S 7/295; G01S 13/86
[52] U.S. Cl. .................. 342/189; 342/52; 342/53; 342/96; 342/195; 364/516
[58] Field of Search .............. 342/96, 189, 195, 52, 342/53, 59, 95, 96; 364/516

[56] References Cited

U.S. PATENT DOCUMENTS 3,731,304  5/1973  Caspers et al. .............. 342/96 X
4,550,318 10/1983  Prengaman et al. .......... 342/96 X Primary Examiner—Gilberto Barron, Jr.
Attorney, Agent, or Firm—W. G. Sutcliff

[57] ABSTRACT

Sensor detections received over time are analyzed to find relationships therebetween. For example, radar echoes, outputs from an infrared sensor, etc., may be analyzed to find target tracks. First, gross similarities are detected by mapping, e.g., angular readings into angle bins using each of a plurality of hypothesized rates of change of angle. Those sensor detections which are found to correlate with respect to angular measurement are subjected to similar mapping into range bins using rate of change of range. The angle and range bins are compared to determine which represent target tracks. The resulting target tracks may be used to revise the parameters and repeat the same process. For example, if one of the "target" tracks detected on the first pass has an angle of 30°, an angle rate of 2° per minute, a range of 2 kilometers and a range rate of 3 kilometers/second, this target track might be evaluated to determine whether it is a cluster of targets using angle rates varying from 1° per minute to 3° per minute in steps of ¼ degree per minute to map the sensor detections into angle bins ranging from 27° to 33° in steps of 0.2° with similar mapping in a region of range space.

25 Claims, 6 Drawing Sheets

METHOD AND APPARATUS FOR CORRELATING SENSOR DETECTIONS IN SPACE AND TIME

BACKGROUND OF THE INVENTION

1. Field of the Invention

The present invention is directed to correlating sensor detections and, more particularly, to multitarget tracking systems for correlating data from radar and similar target detection systems.

2. Description of the Related Art

In any multitarget tracking system, the sensor detections, i.e., the reports produced by the sensors, must be associated into labeled collections of the same physical object before a track can be established on that object. The required association or correlation is difficult because the sensor systems generally cannot provide reliable target identification to be used as an association discriminant. In other words only if a sensor system provides a unique identification tag on each report, can target tracks be established easily, by associating all reports having matching identification tags. An example of such a sensor system is the Identification Friend or Foe (IFF) system. Since most multitarget tracking systems do not have this capability, it is necessary to detect target tracks based only on the proximity of sensor reports from the same or nearly same physical location over a period of time. This is not easily accomplished when there are a large number of targets (high target density), low sensor data rates, missed detections, false alarms, inaccurate sensor measurements or multiple sensor types which measure dissimilar parameters.

Typical track initiation techniques attempt to form tentative target tracks by associating all possible combinations of sensor reports from scan to scan. The main problem with this technique is that, in dense environments where the number of targets is unknown, too many tentative tracks have plausible behavior over long periods of time; thus significantly increasing the false track rate, processor workload, memory requirements and response time. Because these conventional techniques attempt to "explain" each and every sensor report, the occurrence of sensor false alarms can lead to the generation of false target tracks or the corruption of existing target tracks, further degrading system performance.

Conventional solutions to the problems identified above include the use of several types of consistency checks to detect tracks that exhibit inconsistent platform dynamics. These tracks are then either deleted, split into multiple tracks, or merged with other tracks into a cluster. The goal in these systems is to explain everything while minimizing the false track rate by converging to some optimum number of target (or cluster) tracks over a period of time, a goal which is not often achieved in practice. In addition, these solutions add to the processing overhead and thus must be both efficient and effective to have a net positive affect in addressing the problems identified above.

SUMMARY OF THE INVENTION

An object of the present invention is to reduce the number of decisions which must be made to identify a tentative target track.

Another object of the present invention is to provide a multitarget tracking system having easily controlled cluster resolution.

A further object of the present invention is to provide a multitarget tracking system having a constant false track rate.

Yet another object of the present invention is to provide coherent integration gain in a multitarget tracking system.

A yet further object of the present invention is to provide a multitarget tracking system capable of correlating data from multiple sensors.

Yet another object of the present invention is to provide a multitarget tracking system for generating tentative tracks from sensors supplying only angle information as well as sensors supplying angle and range information.

The above objects are attained by providing a method of correlating sensor detections in space and time, comprising the steps of defining at least one relationship between space and time; mapping the sensor detections in space and time into a first dimension in space using the at least one relationship between space and time to produce mapped detections; and comparing the mapped detections with first predetermined criteria to determine whether at least one group of the sensor detections correlate with the at least one relationship. In a preferred embodiment, the at least one relationship between time and the first dimension in space includes a plurality of relationships between time and an angle, such as azimuth or elevation. In addition, a plurality of relationships between time and a second dimension in space, e.g., distance or range, are defined. The reports of sensor detections are mapped for each relationship between time and angle and, after identifying correlated reports by comparing the mapped detections resulting therefrom, the correlated reports are mapped for each of the relationships between time and distance. Thus, targets identified as correlating to one of the relationships between time and distance also must correlate to one of the relationships between time and angle.

The reports are mapped by dividing a region of space into bins of angle and bins of distance. For example, there may be angles ranging from −10° to 60° and ranges between 5 and 20 kilometers. This region of space may be divided into 20 angle bins and 10 distance bins. The sensor detection reports are mapped to one of the bins of each dimension by translating the report from the time at which the sensor detection was received to a reference time using the relationship between time and angle or distance. A score is produced for each bin using, e.g., an arithmetic or vector sum of the mapped detections in each bin. A bin is identified as being correlated to a tentative target track if the score in that bin is significantly, e.g., 100%, larger than the scores of surrounding bins and larger than a predetermined threshold, e.g., corresponding to 50% to 80% of the possible sensor detections for a single target at a given location.

If the bins are large in size, the preferred embodiment will find clusters of target tracks as well as individual target tracks. To resolve such clusters into individual targets, the above-described procedure is repeated over a smaller region of space, centered on each of the tentative target tracks, using smaller bins. The minimum bin size is limited by the quality of the sensors and other environmental factors.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1A:
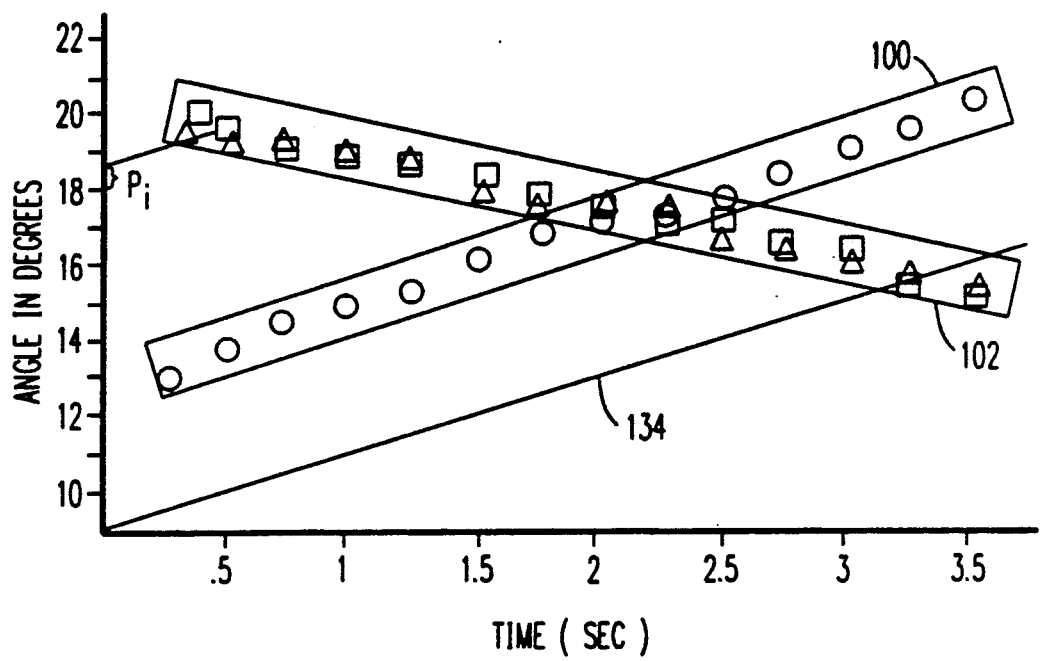
FIG. 1A is a graph of angle versus time for three target tracks.
Figure 1B:
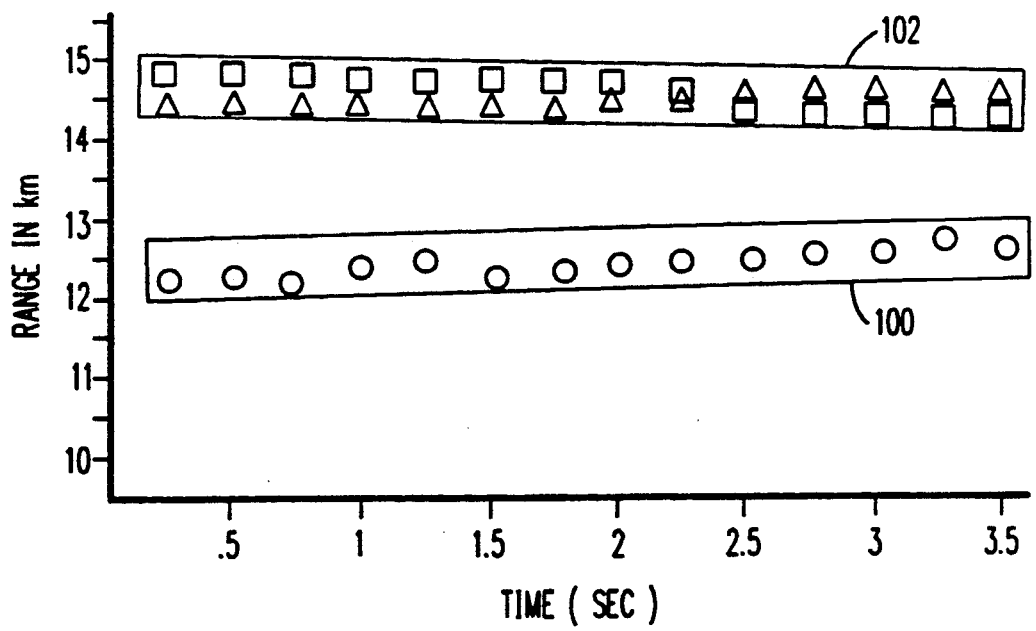
FIG. 1B is a graph of range versus time for the three target tracks illustrated in FIG. 1A.

A simplified example of sensor detections from multiple targets is illustrated in FIGS. 1A and 1B. Since angle and range information is available, the sensor detections illustrated in FIGS. 1A and 1B could have been generated by radar or similar types of sensing devices. However, the present invention is not limited to evaluating sensor detections from sensor systems which generate both angle and range information. Other sensing devices, such as infrared search and track (IRST) and Electronic Support Measures (ESM), which provide only angle information, can also be used, as described below.

In the example illustrated in FIGS. 1A and 1B, one target, represented by small circles, during the period illustrated in FIGS. 1A and 1B, moved between 13° and 20° and moved slightly farther away (in range) as indicated by track 100. Two other targets, represented by small triangles and small squares, moved closely together from 20 degrees to 15 degrees while maintaining approximately the same range, as indicated by (cluster) track 102. To the human eye, tracks 100 and 102 are easily distinguished, but conventional techniques for identifying target tracks cannot easily distinguish the cluster track 102 from the single target track 100. For example, if the range information was not available and conventional processing began near the middle of the time period illustrated in FIG. 1A using angle information only, conventional techniques would require a considerable amount of processing before distinct tracks were identified. Such excessive processing is avoided by using the present invention to detect tracks in a manner similar to that used by a person "eyeballing" the target information.

Figure 2:
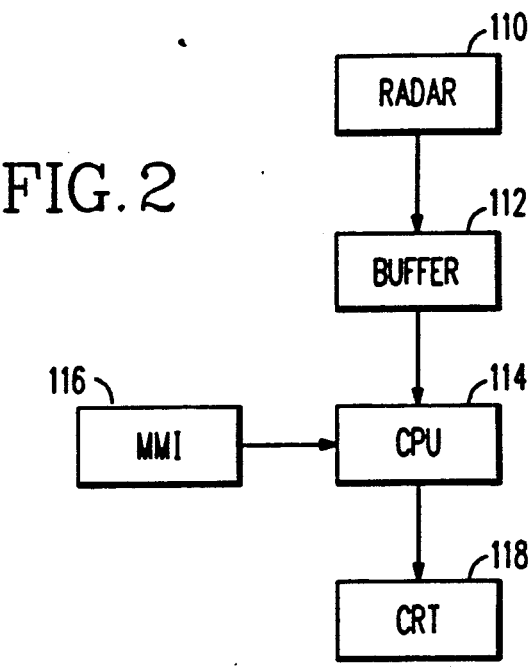
FIG. 2 is a block diagram of a system according to the present invention.

The present invention can be implemented using an apparatus like that illustrated in FIG. 2. Reports of sensor detections from sensing devices, such as a radar system 110, are supplied to a buffer 112. Over a period of time, the buffer 112 stores sensor detections in physical space. Each time the sensing device 110 scans the region of interest in space, a set of reports is stored in the buffer 112. Thus, the reports stored in the buffer represent sensor detections in space and time. A processor (CPU) 114 in turn scans through the buffer 112 to access the data representing reports of sensor detections. The CPU may be any general purpose processor; if used in military applications, a MIL-1750A processor can be used. In a manner described below in more detail, the CPU 114 maps the reports into one dimension in space using at least one relationship between space and time to produce mapped detections for each relationship and compares the mapped detections with predetermined criteria to determine whether at least one group of the sensor detections correlate with the at least one relationship. The criteria are determined based upon control information input via a man-machine interface (MMI) 116 of any conventional type with appropriate switches or keypads. The MMI 116 may be connected while the CPU 114 is analyzing the data so that cluster target tracks can be resolved as desired by the user, or the MMI 116 may be connected only when necessary to change the parameters used by the CPU 114. The correlated sensor detections are output as target tracks on a device such as a CRT 118 or similar device.

Figure 3:
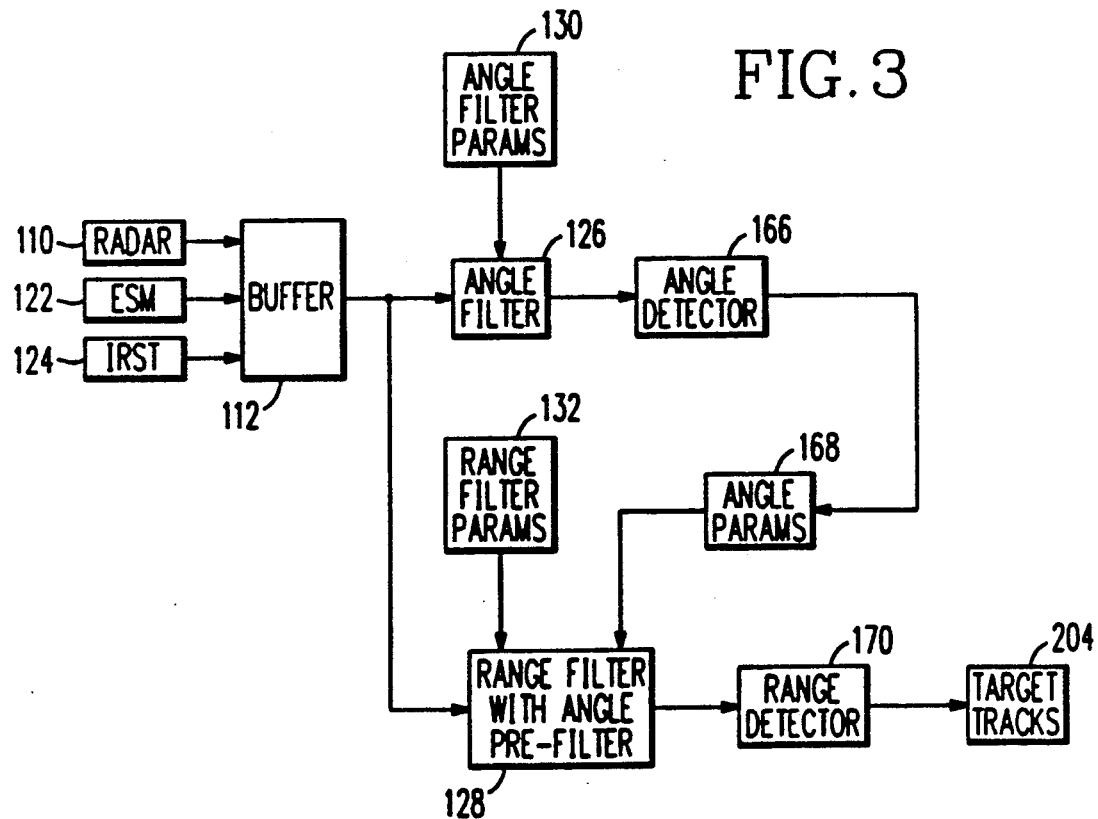
FIG. 3 is a block diagram of a method according to the present invention.

The functional blocks of a system according to the present invention are illustrated in FIG. 3. Examples of signals supplying sensor detections, illustrated in FIG. 3, are radar 110, electronic support measures (ESM) 122 and infrared search and track (IRST) 124. The signals from the radar, ESM and IRST systems are input to the buffer 112. The buffer may be any type of random access memory, commonly employed with the CPU 114, in sufficient amount to store as many scans of each type of signal as desired to be analyzed together, e.g., over a period of 5 to 10 seconds, depending on sensor data rates. The sensor detections are output from the buffer 112 to an angle filter 126 and a range filter 128 with an angle pre-filter. As indicated by the text in block 128, the angle filter 126 operates on the data in the buffer 112 first. Angle and range filter parameters 130, 132 are input via the MMI 116 to control the operation of the angle and range filters 126, 128. These parameters 130, 132 determine the region of space from which sensor detections will be accepted and the degree of resolution desired.

In the preferred embodiment, multiple passes through the angle and range filters 126, 128 are used, so that the initial pass can have relatively large bins that ensure detection of all possible targets of which the sensors are capable of obtaining consistent detections. In subsequent passes, the size of the angle bins may be decreased in an effort to determine whether any of the initially detected target tracks can be resolved into smaller groups of targets or individual targets. The minimum and maximum sizes of the angle bins will be determined by the quality of the sensors, other sources of noise, the degree of resolution required, etc. For example, the initial angle filter parameters 130 may be selected to provide low resolution over an entire region of interest in space. As a result, some of the detected target tracks may be cluster tracks of more than one object traveling close together, while others may be a track from an individual target. If it is unimportant to differentiate between clusters of targets, only a single pass through the process illustrated in FIG. 3 is required.

In the preferred embodiment, the angle and range filters 126, 128 map a plurality of sensor detection reports into first and second dimensions in space, respectively. This is accomplished by defining relationships between space and time and then translating the reports obtained at different times into the dimensions of angle in degrees and range in units of distance, such as kilometers, respectively. The angle filter parameters 130 may define a linear relationship between angle and time like that represented by the line 134 in FIG. 1A or a non-linear relationship may be defined. For example, radar reports of moving targets received by radar in an airplane are typically nonlinear in range and angle. Linear movement in cartesian coordinates can be translated into nonlinear relationships of angle and range to time. Other angle filter parameters define the number and size of angle bins which are also critical in determining whether tracks are detected.

Figure 4A:
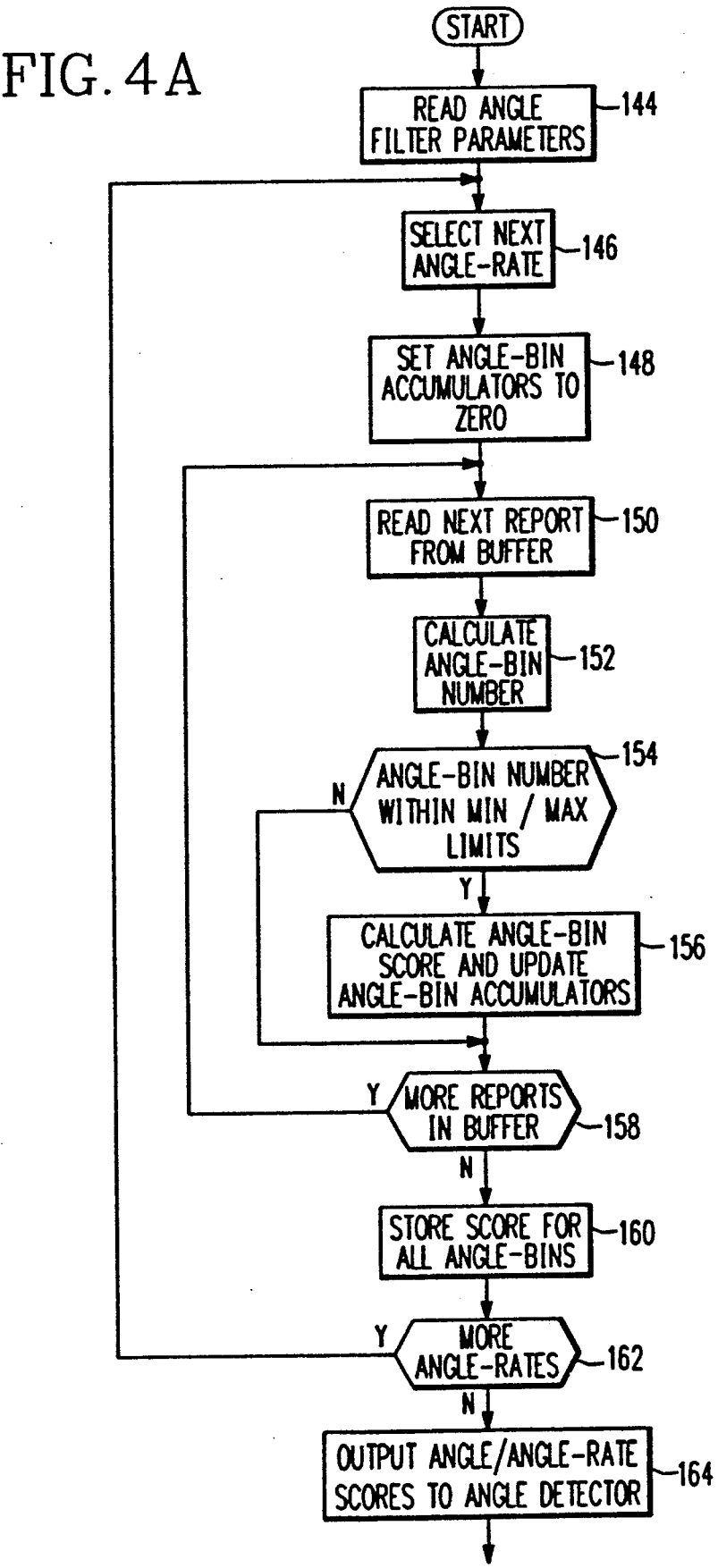
FIGS. 4A and 4B are flowcharts of processing in the angle and range filters, respectively.
Figure 4B:
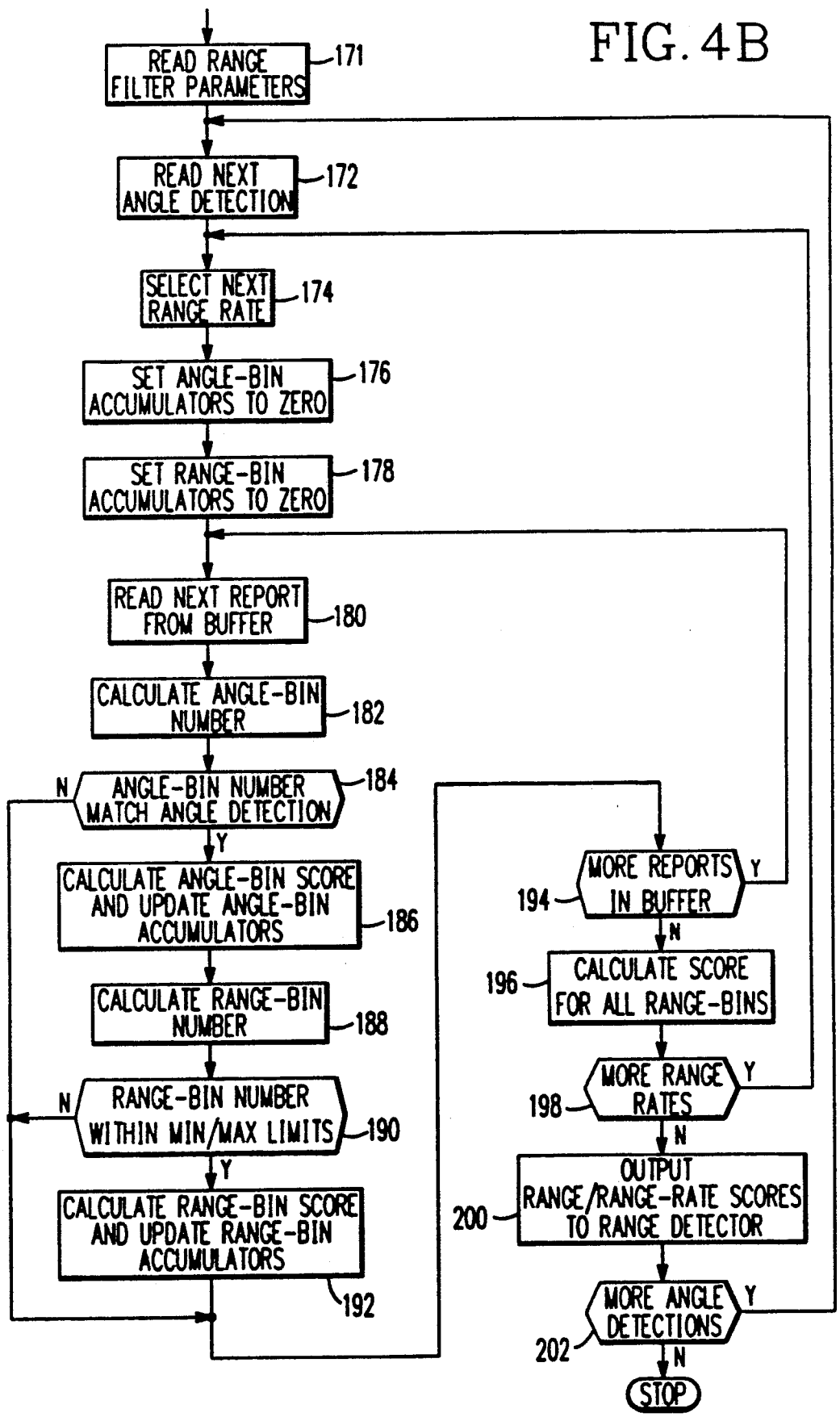

In the preferred embodiment, the angle and range filters 126, 128 are implemented in software executed in the CPU 114. Flowcharts illustrating the procedures executed by the CPU 114 for the angle and range filters 126 and 128 are illustrated in FIGS. 4A and 4B. In the angle filter routine illustrated in FIG. 4A, the angle filter parameters 130 are read 144, an angle rate is selected 146 and angle-bin accumulators are set 148 to zero to initiate processing. Then each sensor detection report is read 150 from the buffer 112 and translated 152 into an angle-bin number using the selected angle rate. If the angle-bin number is determined 154 to be within the region of space defined by the angle filter parameters 130, an angle bin score for that report is calculated 156 and the angle-bin accumulators are updated to reflect that score. Regardless of whether the angle-bin number was within the defined region of space, it is determined 158 whether there are more reports in the buffer 112 and the procedure is repeated until all reports have been read. At that time, the scores for all angle bins are stored 160 and the process is repeated for another angle rate.

When it is determined 162 that all angle rates have been used to translate the reports, the scores are output 164 to an angle detector 166. Preferably, the angle detector 166 compares each bin with one or more surrounding bins in both angle and angle rate directions and identifies a bin as corresponding to a potential target track if the bin has a score, e.g., twice as high as surrounding bin(s). In addition, the scores are compared with a fixed threshold so that a bin with a score produced by a single report, surrounded by bins into which no reports were mapped, does not produce a potential target track.

For example, if the reports illustrated in FIG. 1A are being processed and the relationship corresponding to line 134 is used to translate the sensor detections represented by the small circles in track 100, the resulting mapped detections will lie between 12° and 14°. If the angle bins are 3° or larger and include all of the angles between 12° and 14°, all of the sensor detections in track 100 will be mapped into the bin including 12° to 14° by step 152. On the other hand, the sensor detections in track 102 will be mapped into several bins including 8° to 20°. This will include four bins in the region of space (and time) illustrated in FIG. 1A. A score will be produced 156 for each of the bins, based on the mapped detections in the bins.

In the angle filter 126, the relationship between space and time is an angle rate, like the relationship illustrated by line 134. Typically, a plurality of angle rates are defined in the angle filter parameters 130, so that many different types of target tracks can be detected. The output 164 from the angle filter 126 is a set of scores for all of the angle bins for each of the hypothesized angle rates. These scores are processed by the angle detector 166 which applies predetermined criteria to determine whether at least one group of the sensor detections correlate with one of the range rates. In other words, the angle detector 166 determines whether any of the angle bins for a particular angle rate has a score which is sufficiently high to indicate that a target at that angle at some point during the scan moved with the corresponding angle rate. Signals identifying the angle bin and angle rate of all potential target tracks identified by the angle detector 166 are included in angle parameters 168 which are provided to the range filter 128.

The range filter 128 operates on the same set of data operated on by the angle filter 126 and uses the angle parameters 168 to select only those reports for which a potential target track was located by the angle detector 166. The range filter parameters 132 define range bins and hypothetical range rates which are used to produce mapped detections in range. The scores representing the mapped detections in each of the bins for each of the range rates are supplied to a range detector 170 which compares the scores using a second set of predetermined criteria to determine whether any of the sensor detections meet both the first and second criteria.

The process performed by the CPU 114 to provide range filter 128 is illustrated in FIG. 4B. As in the case of the angle filter 126, the range filter parameters are read 171, an initial angle detection is read 172 from the angle parameters 168, an initial range rate is selected 174 and the angle bin and range bin accumulators are set to zero 176, 178. A sensor detection is read 180 from the buffer 112 and translated 182 into an angle-bin number using the angle and angle rate of change specified by the angle detection 172. If the angle-bin number corresponds 184 to the angle detection read in step 172, the angle-bin score is calculated and angle-bin accumulators updated 186 in a manner similar to that used in the angle filter 126. The selected range rate is then used to calculate 188 a range-bin number which is compared 190 with the maximum and minimum limits on the region of interest in space. If the range-bin number is within the region of interest, a range-bin score is calculated and the range-bin accumulators updated 192.

Regardless of whether the sensor detection read in step 180 passes through the angle pre-filter and lies within the region of interest in space, the buffer 112 is checked to determine 194 whether there are any more reports. When all the reports have been read, scores are calculated 196 for all of the range bins and the procedure is repeated for all range rates. When it is determined 198 that all the range rates have been used, the range and range rate data is output 200 to the range detector 168. This procedure is repeated until it is determined 202 that all angle detections have been used to pre-filter the sensor reports processed by the range filter.

In the example illustrated in FIGS. 1A and 1B, assuming that one of the hypothetical range rates is zero change in range and range bins are at least one kilometer wide, track 100 will be detected. On the other hand, if the range bins are one hundred meters wide, target track 100 might not be detected, or might be detected as several parallel tracks, depending upon the criteria used by the range detector 170. In the same scenarios, using one kilometer range bins, track 102 might be detected as a cluster track, while using one hundred meter range bins track 102 might be split into distinct tracks or not detected at all, depending on the criteria used by the range detector 170 and the hypothesized rates of change of range defined by the range filter parameters 132.

There are several ways of generating scores for the angle and range bins. The simplest is a straight histogram technique where each map detection in a bin is counted and the sum is output as the score for that bin at that rate. Another technique which can be used with the present invention is to weight each mapped detection based upon its position within the bin. By using formula (1) below to calculate the score for each bin, target tracks which cause map detections to be distributed across a bin will have little effect on the score of the bin. In formula (1), $p_i$ represents position of an ith mapped detection within the bin (see FIG. 1A), BS equals the size of the bin and N equals the number of mapped detections in the bin.

$$\text{score} = \left[\sum_{i=1}^{N} \sin\left(\frac{2\pi \cdot p_i}{BS}\right)\right]^2 + \left[\sum_{i=1}^{N} \cos\left(\frac{2\pi \cdot p_i}{BS}\right)\right]^2 \quad (1)$$

In the example illustrated in FIG. 1A, the angle values of track 100 fluctuate over 1.5° to 2° from a straight line parallel to hypothetical track 134, probably due to poor quality sensors. As a result, if the bin size is as narrow as 1° and formula (1) is used, the score of the bins may be so low that no target track will be detected. However, if the bin size is 3° or more and formula (1) is used, the score of a bin from 12° to 15° will likely be identified as containing a target track corresponding to hypothetical target track 134. In a similar respect, the sensor detections in cluster track 102 will likely produce mapped detections which tend to cancel each other out using formula (1) if the angle bins are less than three degrees. A large range bin size will result in target tracks 100 and 102 being included in target tracks 204 output from the range detector 170. As can be seen from the above discussion, angle and range bin sizes are limited by the quality of the sensor detections and the possibility of multiple targets distributed within a bin.

Figure 5:
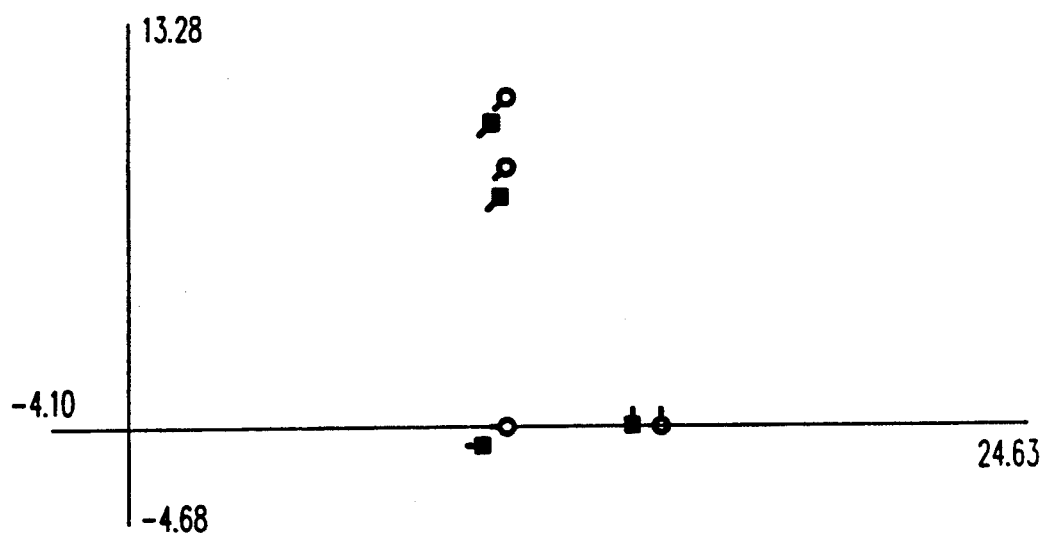
FIG. 5 is an example of four targets in a region of space and corresponding target tracks identified by an embodiment of the present invention.
Figure 6:
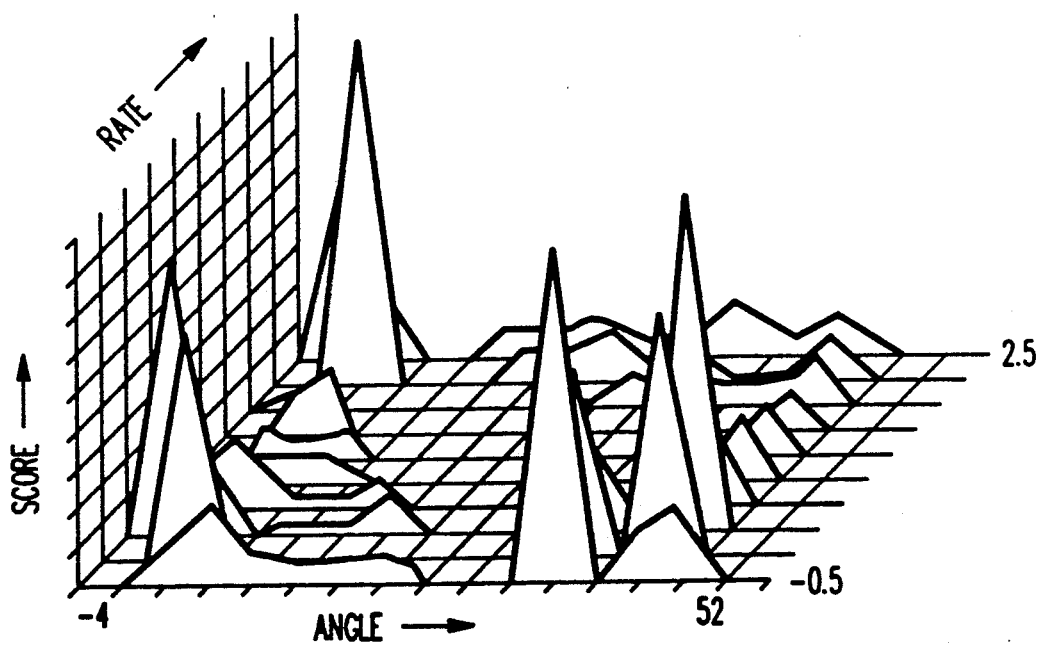
FIG. 6 is a graph of scores for angle and angle rate bins for the example illustrated in FIG. 5.

An example of targets and target tracks produced by a sample run of the present invention is illustrated in FIG. 5. Four targets are represented by circles moving in the direction indicated by short lines and the detected target tracks are represented by small solid squares. The output of the angle filter 126 for the FIG. 5 test data is illustrated in FIG. 6. The angle detector 166 identified four potential targets as indicated in Table I below.

TABLE I

| ANGLE | ANGLE RATE |
|-------|------------|
| 0.0°  | 1.9°/sec   |
| 36°   | −0.5°/sec  |
| 44°   | 0.1°/sec   |
| −4.0° | 0.1°/sec   |

Figure 7:
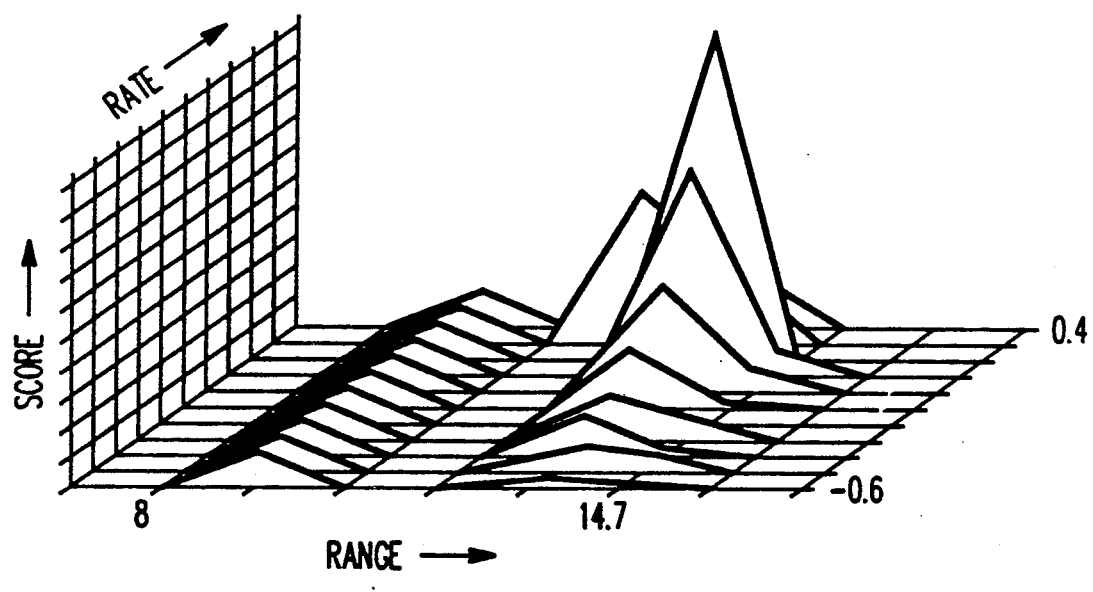
FIG. 7 is a graph of range and range rate scores for one of the targets illustrated in FIG. 5.

The output of the range filter 128 for the detection (angle 0°, angle rate 1.9° per second) is illustrated in FIG. 7. The range detector 170 detected a target at range 13.33 Km with a range rate of 0.1 Km/sec corresponding to this angle detection. The detected target tracks (solid squares) illustrated in FIG. 5 have been deliberately offset from the targets (small circles) to aid in distinguishing the inputs and outputs. This result was obtained by assigning potential target tracks the lowest position in the bins found by the angle and range detectors 166, 170 to contain target tracks. More accurate results can be obtained by using the midpoint of the bins or by adjusting the position of the target tracks based upon the position of the mapped detections within the bins.

The present invention can be applied to many situations. In the case of fighter aircraft, the initial and possibly only pass through the filters might use angle and range filter parameters, such as those indicated in Table II below.

TABLE II

|                      | RANGE       | ANGLE     |
|----------------------|-------------|-----------|
| Minimum Rate         | −0.8 km/sec | −0.1°/sec |
| Maximum Rate         | −0.2 km/sec | 0.1°/sec  |
| Number of Rate Steps | 10          | 3         |
| Minimum Bin          | 0 km        | −90°      |
| Maximum Bin          | 50 km       | 90°       |
| Number of Bins       | 62          | 202       |

In the case of surveillance aircraft monitoring enemy movements, fine resolution of all targets may be undesirable due to the processing time required. For targets at long range, cluster tracks identified by one pass may be sufficient. However, when the targets are closer, it may be more desirable to resolve target tracks to the extent possible in an effort to determine the exact number of targets. Therefore, it may be desirable to control the number of passes through the system either manually, or based upon distance of the closest target.

For example, if one of the "target" tracks detected on the first pass has an angle of 30°, an angle rate of 2° per minute, a range of 2 kilometers and a range rate of 3 kilometers/second, this target track might be evaluated to determine whether it is a cluster of targets using angle rates varying from 1° per minute to 3° per minute in steps of ¼ degree per minute to map the sensor detections into angle bins ranging from 27° to 33° in steps of 0.2° with similar mapping in a region of range space. In the example illustrated in FIGS. 1A and 1B, it is possible to resolve the two target tracks in cluster track 102 using range information, particularly if the time window is narrowed to the period from 1.5 to 3 seconds as illustrated in FIG. 1B.

The examples above all use reports of sensor detections which provide both range and angle. In a system like that illustrated in FIG. 3 in which some reports (from ESM and IRST systems 122, 124) provide only angle information, the range data supplied to the range filter can be coded to pass through other information obtained by the sensor system. For example, the range can be assigned a negative value determined by the identification obtained from the ESM system 122. The range filter parameters 132 must be set to provide a bin including all possible negative values and a zero range rate, so that the sensor detections from the ESM system 122 detected by the angle filter and angle detector can be output as target tracks 204.

The many features and advantages of the present invention are apparent from the detailed specification, and thus it is intended by the appended claims to cover all such features and advantages of the method and apparatus which fall within the true spirit and scope of the invention. Further, since numerous modifications and changes will readily occur to those skilled in the art from the disclosure of this invention, it is not desired to limit the invention to the exact construction and operation illustrated and described. For example, other types of sensor detections from other types of sensors besides those used by fighter aircraft may benefit from correlation using the present invention. Any positional sensor detection with various rates of change can be subjected to filtering and analysis according to the invention. Accordingly, suitable modifications and equivalents may be resorted to, all falling within the scope and spirit of the invention.

What is claimed is:

1. A method of correlating sensor detections in space and time, comprising the steps of:
   (a) defining at least one relationship between space and time;
   (b) mapping the sensor detections in space and time into a first dimension in space using the at least one relationship between space and time to produce first mapped detections; and
   (c) comparing the mapped detections with first predetermined criteria to determine whether at least one group of the sensor detections correlate with the at least one relationship.

2. A method as recited in claim 1,
   wherein the at least one relationship defined in step (a) includes at least one relationship between time and the first dimension in space and between time and a second dimension in space,
   wherein said mapping in step (b) is performed using the at least one relationship between time and the first dimension in space, and
   wherein said method further comprises the steps of:
   (d) mapping the sensor detections in space and time into the second dimension to produce second mapped detections using the at least one relationship between time and the second dimension in space for each group of the sensor detections determined in step (c) to be correlated with the at least one relationship between time and the first dimension; and
   (e) comparing the second mapped detections with second predetermined criteria to determine whether at least one subset of the at least one group of the sensor detections correlate with the at least one relationship between time and the second dimension.

3. A method as recited in claim 2,
   wherein the at least one relationship defined in step (a) includes a plurality of relationships between time and each of the first and second dimensions,
   wherein said mapping and comparing in steps (b) and (c) are repeated in sequence for each of the relationships between time and the first dimension in space, and
   wherein said mapping and comparing in steps (d) and (e) are repeated in sequence for each of the relationships between time and the second dimension in space after said mapping and said comparing in steps (b) and (c) have been completed for all of the relationships between time and the first dimension in space.

4. A method as recited in claim 3, wherein the sensor detections are obtained by at least one sensor located at a reference point,
   wherein the first dimension is an angle between a reference line passing through the reference point and a line passing through each sensor detection and the reference point, and
   wherein the second dimension is distance from the reference point.

5. A method as recited in claim 4, wherein the relationships defined in step (a) are rate of change of angle and rate of change of distance.

6. A method as recited in claim 5, wherein the angle is azimuth from the reference point.

7. A method as recited in claim 5, wherein the angle is elevation from the reference point.

8. A method as recited in claim 5,
   further comprising the step of (f) defining bins, regularly spaced within a region of interest in space, and
   wherein steps (b) and (d) each comprises the step of translating the sensor detections at different times into the bins of angle and distance, using the rates of change of angle and distance, respectively.

9. A method as recited in claim 8,
   further comprising the step of (g) assigning a score to each bin in the region of interest in space in dependence upon position of the mapped sensor detections within the bin, and
   wherein said comparing in each of steps (c) and (e) comprises comparing the score of each bin with surrounding bins and with a threshold.

10. A method as recited in claim 9, wherein said assigning in step (g) comprises the step of calculating the score for each bin according to:

$$\text{score} = \left[ \sum_{i=1}^{N} \sin\left( \frac{2\pi \cdot p_i}{BS} \right) \right]^2 + \left[ \sum_{i=1}^{N} \cos\left( \frac{2\pi \cdot p_i}{BS} \right) \right]^2,$$

where N=number of mapped detections in the bin, $p_i$=position of an ith mapped detection within the bin, BS=the size of each bin and $p_i/BS$ has a value between 0 and 1.

11. A method as recited in claim 9, wherein said assigning in step (g) comprises the step of calculating the score for each bin by summing the number of mapped detections in the bin.

12. A method as recited in claim 8, further comprising the step of (h) identifying a current location for correlated sensor detections determined in step (e) to correspond to one of the bins of distance.

13. A method as recited in claim 8, wherein said translating in steps (b) and (d) uses a linear relationship between rates of change of angle and distance, respectively.

14. A method as recited in claim 8, further comprising the step of (g) converting linear hypotheses in cartesian coordinates into the relationships defining rates of change of angle and distance.

15. A method as recited in claim 8, further comprising the step of (g) repeating steps (b)–(e), after repeating steps (a) and (f) to revise the relationships and after revising the first and second predetermined criteria, to evaluate whether the sensor detections determined in step (e) to be correlated can be resolved into a larger number of groups than produced by an immediately preceding execution of step (e).

16. A method as recited in claim 5, wherein said mapping in steps (b) and (d) uses a linear relationship defining rates of change of angle and distance, respectively.

17. A method as recited in claim 5, further comprising the step of (g) converting linear hypotheses in cartesian coordinates into the relationships defining rates of change of angle and distance.

18. A method as recited in claim 3, wherein the sensor detections are obtained by at least one sensor located at a reference point,
   wherein the relationships defined in step (a) include rates of change of angle and distance,
   wherein said method further comprises the step of (f) defining bins, regularly spaced within a region of interest in space, and
   wherein said mapping in steps (b) and (d) each comprises the step of translating the sensor detections at different times into the bins in angle and distance, using the rates of change of angle and distance, respectively.

19. A method as recited in claim 2, further comprising the steps of:
   (f) revising the first and second predetermined criteria; and
   (g) repeating steps (b)-(e), after said revising in step (f) and after repeating step (a) to revise the relationships, to evaluate whether the sensor detections detected as being correlated in step (e) can be resolved into a larger number of groups than produced by an immediately preceding execution of step (e).

20. A method as recited in claim 1,
   wherein the at least one relationship in the first dimension defined in step (a) includes a plurality of relationships in the first dimension, and
   wherein said mapping and comparing in steps (b) and (c) are repeated in sequence for each of the relationships between time and the first dimension in space.

21. A method as recited in claim 20,
   further comprising the step of (d) defining bins, regularly spaced along the first dimension in a region of interest in space, and
   wherein said mapping in step (b) comprises the step of translating the sensor detections at different times into the bins in the first dimension, using the relationship between time and the first dimension.

22. A method as recited in claim 21, further comprising the step of (e) identifying a current location for correlated sensor detections determined in step (c) to correspond to one of the bins in the first dimension.

23. A method as recited in claim 1, further comprising the step of:
   (d) revising the first predetermined criteria; and
   (e) repeating steps (b) and (c), after said revising in step (d) and after repeating step (a) to revise the at least one relationship, to evaluate whether the sensor detections detected as being correlated in step (c) can be resolved into a larger number of groups than produced by an immediately preceding execution of step (c).

24. An apparatus for correlating relationships between sensor detections in space and time, comprising:
   control input means for defining at least one relationship between space and time;
   processing means for mapping the sensor detections in space and time into a first dimension in space using the at least one relationship between space and time to produce mapped detections; and
   output means for comparing the mapped detections least one group of the sensor detections correlate with the at least one relationship and for outputting an indication of the sensor detections found to correlate.

25. An apparatus for correlating relationships between sensor detections in space and time, comprising:
   sensing devices to generate sensor detections in space and time;
   a buffer, operatively connected to said sensing devices, to store the sensor detections;
   a processor, operatively connected to said buffer, to scan said buffer for the sensor detections, to map the sensor detections into a first dimension in space using at least one relationship between space and time to produce mapped detections for each relationship and to compare the mapped detections with predetermined criteria to determine whether at least one group of the sensor detections correlate with the at least one relationship; and
   an output device for displaying a current location corresponding to each group of the sensor detections determined by said processor to be correlated with the at least one relationship.

* * * * *